United States Patent [19]

Hung et al.

[11] Patent Number: 5,024,412
[45] Date of Patent: Jun. 18, 1991

[54] HANGER ASSEMBLY

[75] Inventors: Shih-Ho Hung, Taichung Hsien; Tsui-Chen Hsu, Taichung, both of Taiwan

[73] Assignee: Llama Precision Inc., Taichung Hsien, Taiwan

[21] Appl. No.: 597,309

[22] Filed: Oct. 15, 1990

[51] Int. Cl.$^5$ .............................................. B42F 13/00
[52] U.S. Cl. ................................. 248/343; 220/3.9; 248/546; 248/906
[58] Field of Search ............... 248/546, 656, 544, 342, 248/343, 57, 217.2, 906; 220/3.9; 52/118, 39, 28; 200/340, 293, 61.41, 61.42

[56] References Cited

U.S. PATENT DOCUMENTS

| | | | |
|---|---|---|---|
| 2,302,506 | 11/1942 | Richards | 200/61.42 X |
| 3,797,789 | 3/1974 | Wasson | 52/28 X |
| 4,041,657 | 8/1977 | Schuplin | 52/39 |
| 4,062,512 | 12/1977 | Arnold | 248/906 X |
| 4,391,428 | 7/1983 | Grimes | 248/906 X |
| 4,463,923 | 8/1984 | Reiker | 248/546 |
| 4,513,940 | 4/1985 | Alperin | 248/343 X |
| 4,518,141 | 5/1985 | Parkin | 248/906 X |
| 4,538,786 | 9/1985 | Manning | 248/656 |
| 4,645,158 | 2/1987 | Manning | 248/343 |
| 4,659,051 | 4/1987 | Propp | 248/546 |
| 4,667,916 | 5/1987 | Richards | 248/343 |
| 4,682,452 | 7/1987 | Propp | 52/118 |
| 4,684,092 | 8/1987 | Reiker | 248/343 X |
| 4,717,099 | 1/1988 | Hubbard | 248/57 |
| 4,727,352 | 2/1988 | Doller | 200/61.42 X |
| 4,754,947 | 7/1988 | Propp | 248/343 X |
| 4,909,405 | 3/1990 | Kerr | 220/3.9 |

FOREIGN PATENT DOCUMENTS 244677 12/1925 United Kingdom ................. 248/57

Primary Examiner—J. Franklin Foss
Attorney, Agent, or Firm—Cushman, Darby & Cushman

[57] ABSTRACT

An expansible load-bearing junction box hanger assembly adapted for installation from beneath the ceiling and through a junction box opening in the ceiling, includes a pair of walls having a plurality of spike protrusions to engage two spaced adjoining ceiling joists and an elongated linearly expanding brace device which is aligned with and connected between the walls. The brace device expands from a short to a longer length to force each of the walls to contact and engage their respective ceiling joists. Each wall is provided with a receiving groove adjacent to the spike protrusions. The hanger assembly further includes an alarm device, a battery cell, and a contact switch disposed in each receiving groove and actuated when the walls engage their respective ceiling joists. The contact switches electrically connect the alarm device to the battery cell to operate the alarm device when actuated, thereby indicating that the hanger assembly has fully engaged the ceiling joists.

3 Claims, 4 Drawing Sheets

HANGER ASSEMBLY

BACKGROUND OF THE INVENTION

1. Field Of The Invention

The invention relates to a hanger assembly for suspending heavy objects such as ceiling fans, more particularly to such a hanger assembly which is adapted for installation through a junction box opening in a ceiling without the necessity for entry into the space above the ceiling.

2. Description Of The Related Art

A conventional hanger assembly for suspending heavy loads, as disclosed in U.S. Pat. No. 4,463,923, is shown in FIGS. 1A and 1B. The center portion of a previously installed light-weight hanger assembly has been removed, leaving stub portions 240 intact. The hanger assembly 100 is maneuvered through a junction box opening 210 in a ceiling 200 and is to be installed between parallel horizontal joists 220 and 230. The hanger assembly 100 includes a plurality of points 110 to engage and bite into the respective joists 220 and 230 when extended. The points 110 are disposed on feet 120A and 120B which straddle the stub portions 240. The hanger assembly 100 is provided with an elongated tubular brace member 130 having a hexagonal outer peripheral surface and a central axial bore 140 that is internally threaded on one end 131. One end 151 of a threaded rod 150 mates with the end 131. The other end of the rod 150 is rigidly mounted on the foot 120B. The end 132 of the brace member 130 is rotatably mounted on the foot 120A. During installation, the hanger assembly 100 is initially at a minimum length and the brace member 130 and the rod 150 are supported by the feet 120A and 120B in a direction parallel to the plane of the ceiling. The brace member 130 is then rotated, as by engagement with a wrench, to expand the hanger assembly 100 and urge the points 110 to bite and engage the respective horizontal joists 220 and 230. Rotation of the brace member 130 is stopped when the points 110 have tightly engaged the respective joists 220 and 230. A pair of bracket members (not shown) have opposing surfaces complementary to the outer peripheral surface of the brace member 130 and are tightly secured to the brace member 130 by means of screws. Finally, a junction box of the load to be suspended is mounted on the bracket members.

A main disadvantage of the hanger assembly disclosed in U.S. Pat. No. 4,463,923 is that since the hanger assembly is installed from beneath the ceiling and through a junction box opening in the same, one cannot be sure if the hanger assembly has been properly installed, i.e., the points fully engaged the respective ceiling joists. Furthermore, there is a possibility that the brace member 130 might disengage from the rod 150 if the distance between the joists 220 and 230 is wider than the total length of the brace member 130 and the rod 150.

SUMMARY OF THE INVENTION

Therefore, the objective of the present invention is to provide an expansible load-bearing junction box hanger assembly adapted for installation from beneath the ceiling and through a junction box opening in the same, said hanger assembly incorporating an alarm device which is actuated when the hanger assembly has fully engaged the ceiling joists.

Another objective of the present invention is to provide an expansible load-bearing junction box hanger assembly having provisions to prevent the untimely disengagement of the rod from the brace member.

Accordingly, an expansible load-bearing junction box hanger assembly of the present invention includes a first wall and a second wall spaced from the first wall. The first and second walls each have a plurality of spike protrusions to engage two spaced adjoining ceiling joists. An elongated linearly expanding brace means is aligned with and connected between the first and second walls. The brace means readily expands in length to force each of the first and second walls to contact and engage their respective ceiling joists. The brace means includes a tubular member rotatably mounted to the first wall and a threaded rod member threadedly and telescopically connected to the tubular member. One end of the threaded rod member is in fixed non-rotative engagement with the second wall. The first and second walls support the brace means in a direction substantially parallel to the plane of the ceiling. A junction box connecting means rigidly connects a junction box of a heavy load to the central section of the brace means.

Each of the first and second walls has a receiving groove adjacent to the spike protrusions. The hanger assembly further comprises an alarm device, a cell means, and a switching means including a contact switch disposed in each of the receiving grooves and actuated when the first and second walls engage their respective ceiling joists. The switching means electrically connects the alarm device to the cell means to operate the alarm device when the switching means is actuated, thereby indicating that the hanger assembly has fully engaged the ceiling joists.

The tubular member has a threaded bore and an inward annular flange at one end. The threaded rod member is in sliding contact with an inner annular edge of the annular flange. The threaded rod member has an enlarged threaded end extending into the tubular member and engaging the threaded bore. The threaded rod member thus contacts two portions of the tubular member: the first portion being at the threaded bore of the tubular member and the second portion being at the annular flange. The increase in the area of contact between the tubular member and the threaded rod member enhances the stability of the hanger assembly and correspondingly increases the load-bearing capacity of the same. The annular flange also serves to prevent the disengagement of the threaded rod member from the tubular member during the expansion of the brace means.

BRIEF DESCRIPTION OF THE DRAWINGS

Other features and advantages of this invention will become apparent in the following detailed description of the preferred embodiment with reference to the accompanying drawings, of which.

DETAILED DESCRIPTION OF THE PREFERRED EMBODIMENT

Figure 1A:
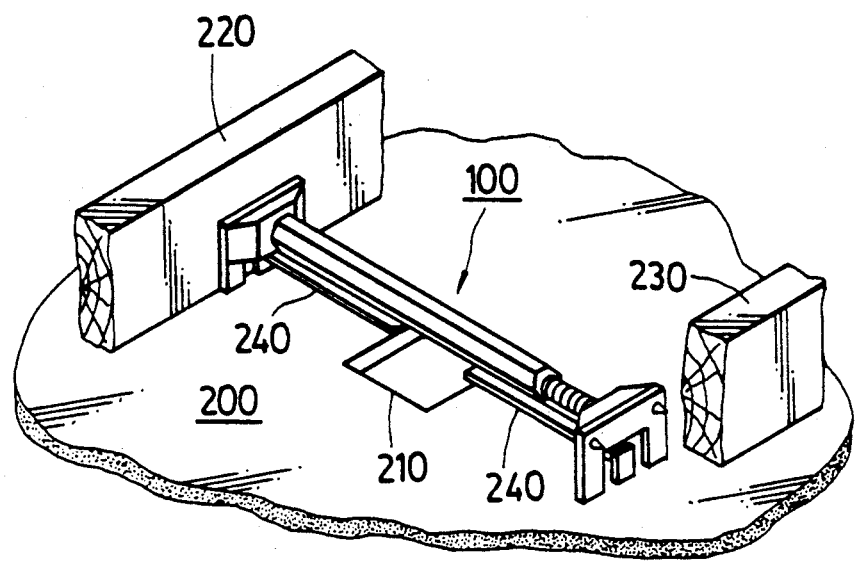
FIG. 1A is a perspective view of the hanger assembly disclosed in U.S. Pat. No. 4,463,923, as viewed from above the ceiling.
Figure 1B:
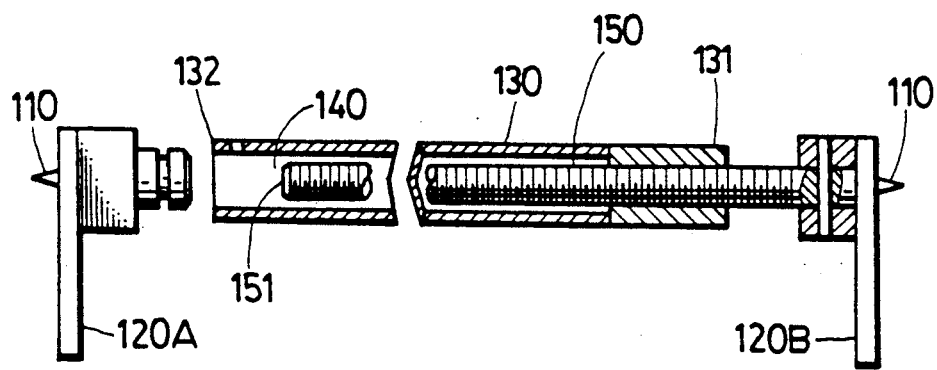
FIG. 1B is a partly sectional side elevation view of the hanger assembly shown in FIG. 1.
Figure 2:
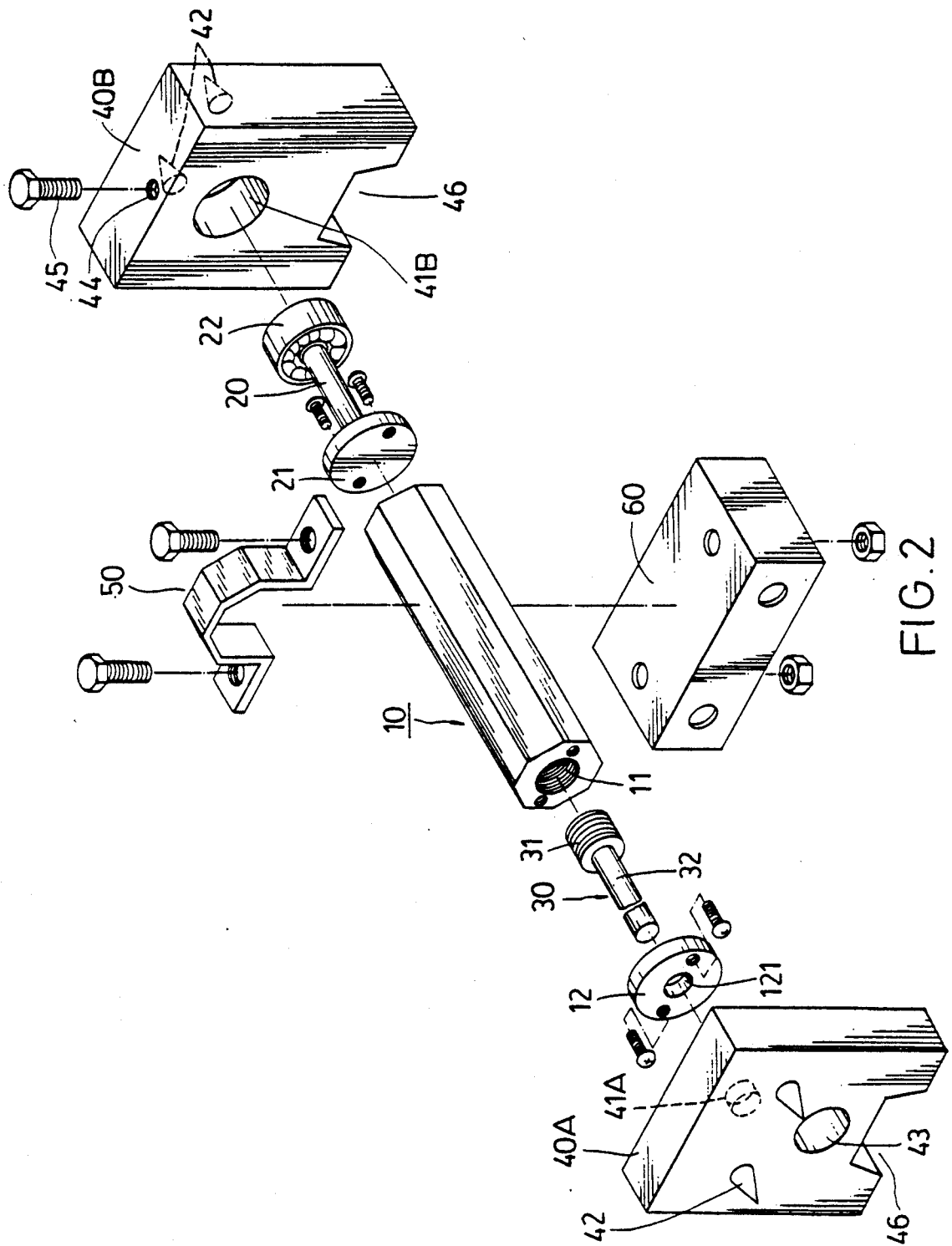
FIG. 2 is an exploded view of the preferred embodiment of an expansible load-bearing hanger assembly according to the present invention.
Figure 3:
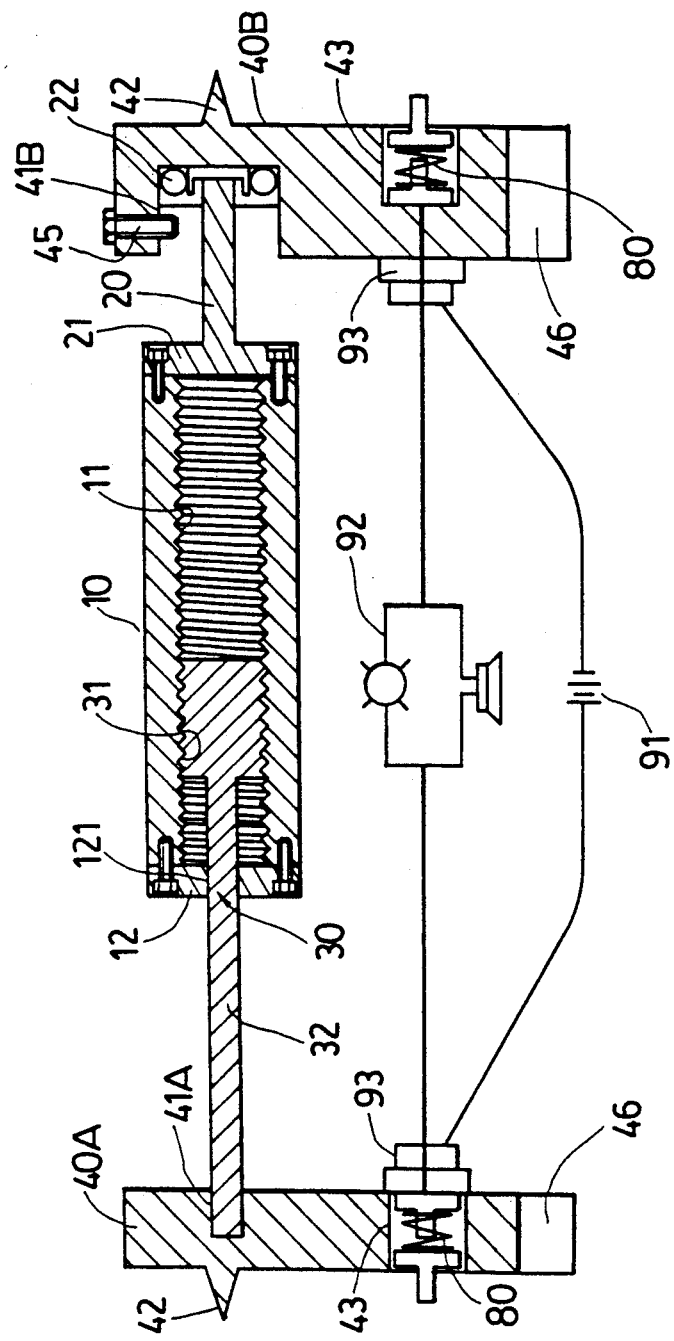
FIG. 3 is a sectional side elevation view of the preferred embodiment as shown in FIG. 2.

Referring to FIGS. 2 and 3, the preferred embodiment of a hanger assembly according to the present invention is shown to comprise an elongated tubular brace member 10, a threaded rod member 30, and a pair of engaging walls 40A and 40B.

Figure 4:
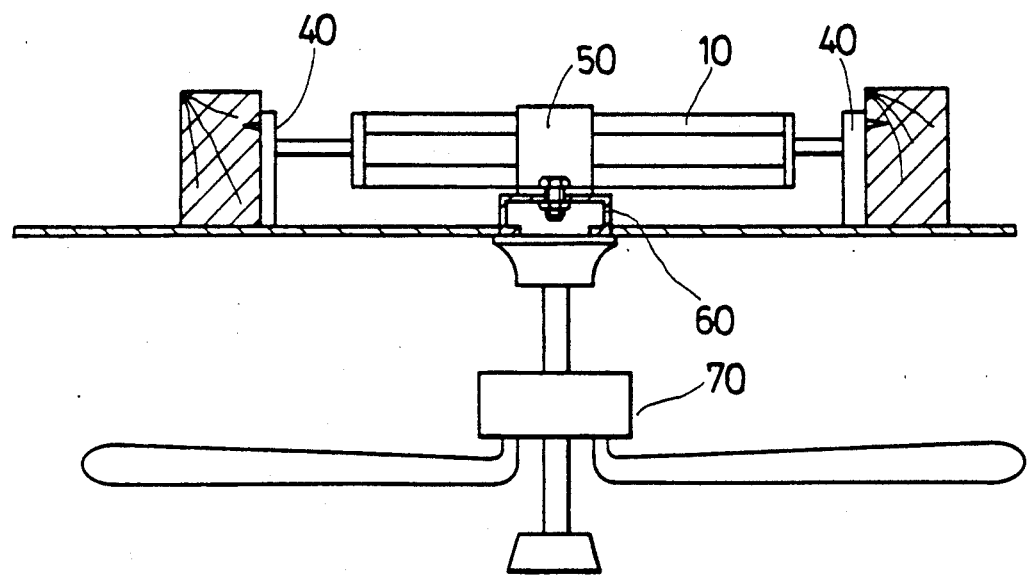
FIG. 4 is a side elevation view illustrating the preferred embodiment when in use.

The outer peripheral surface of the brace member 10 is non-round, the preferred configuration being octagonal. The brace member 10 has a central internally threaded bore 11 extending along the axis of the brace member 10. A bracket member 50 complements the non-round outer peripheral surface of the brace member 10. The bracket member 50 is firmly and rigidly connected to a junction box 60. The bracket member 50 rigidly secures the brace member 10 to the junction box 60. The junction box 60 supports a load 70 which may be a ceiling fan (as shown in FIG. 4), a light fixture, a chandelier, or any similar article. A guide plate 12 having a central through hole 121 is mounted on one end of the brace member 10. The guide plate 12 thus forms an inward annular flange on the one end of the brace member 10. A mounting plate 21 is provided on the other end of the brace member 10. An elongated post 20 is similarly aligned with the axis of the bore 11 and has one end attached to the mounting plate 21. The elongated post 20 is thus stationary relative to the brace member 10. The engaging wall 40B has a recess 41B which receives a bearing member 22. The engaging wall 40B has a screw hole 44 which is transverse to the axis of and communicated with the recess 41B. The screw hole 44 receives a screw 45 which prevents axial movement of the bearing member 22 out of the recess 41B. The other end of the elongated post 20 extends into the recess 41B and is surrounded by ball bearings of the bearing member 22. The elongated post 20 is thus permitted to rotate with the brace member 10.

The threaded rod member 30 has an enlarged threaded end 31 which mates with the bore 11 of the brace member 10. The other end of the rod member 30 is provided with an elongated rod portion 32 which is in sliding contact with an inner annular edge defining the central through hole 121 of the guide plate 12. The rod portion 32 is fixed to the engaging wall 40A at a recess 41A of the same. The engaging walls 40A and 40B are provided with a plurality of spikes 42 to engage and bite into a pair of spaced horizontal ceiling joists (not shown) when actuated. A trapezoidal central notch 46 is provided on a lower end of each of the engaging walls 40A and 40B to permit the engaging walls 40A and 40B to straddle stub portions which remain intact after a previously installed light-weight hanger assembly has been partially removed. The engaging walls 40A and 40B are further provided with a receiving groove 43 disposed adjacent to the spikes 42 and the trapezoidal notch 46. A contact switch 80 is provided in each receiving groove 43. When actuated, the contact switches 80 electrically connect an alarm device 92 to a battery cell means 91. The alarm device 92 may be a light device, a buzzer or a combination of both.

The preferred embodiment according to the present invention is installed as follows: The brace member 10 is first rotated to contract the hanger assembly to its minimum length. The hanger assembly is then maneuvered through a junction box opening in the ceiling until the engaging walls 40A and 40B rest on the ceiling. The engaging walls 40A and 40B support the brace member 10 and the rod member 30 in a direction parallel to the plane of the ceiling. The brace member 10 is then rotated so as to axially expand the hanger assembly and urge the spikes 42 to bite and engage the horizontal joists. Rotation of the brace member 10 causes axial movement of the rod member 30 to force the engaging walls 40A and 40B to contact the horizontal joists. (The rod member 30 is prevented from disengaging from the brace member 10 during the expansion of the hanger assembly by the guide plate 12.) When the spikes 42 have tightly engaged the horizontal joists, the horizontal joists fully depress the contact switches 80 to actuate the same. The contact switches 80 electrically connect the alarm device 92 to the battery cell means 91, thereby triggering the alarm device 92 into operation. The alarm device 92 sends out signals to indicate that the hanger assembly has been properly installed. A pair of electrical plugs 93 are also provided in the receiving grooves 43 and are pulled out to disable the alarm device 92. Rotation of the brace member 10 is then stopped and the bracket member 50 is installed to firmly and rigidly secure the brace member 10 to the junction box 60. The secure connection between the bracket member 50 and the junction box 60 reduces the torque and vibrations of a ceiling fan load 70 to effectively minimize the shaking and the accompanying noise which is typically encountered during its operation.

Referring to FIG. 4, the height of the engaging walls 40A and 40B is selected in conjunction with the length of the junction box 60 so that the lower edge of the junction box 60 will be substantially flushed with the lower surface of the ceiling. This arrangement effectively hides the electrical cables coming from the load 70 and extending into the junction box 60.

The rod member 30 contacts two portions of the brace member 10: the first portion being at the bore 11 of the brace member 10 and the second portion being at the guide plate 12. The increase in the area of contact between the brace member 10 and the rod member 30 enhances the stability of the hanger assembly of the present invention and correspondingly increases the load-bearing capacity of the same.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. An expansible load-bearing junction box hanger assembly adapted for installation from beneath the ceiling and through a junction box opening in the ceiling, including a first wall and a second wall spaced from said first wall, said first and said second walls having a plurality of spike protrusions to engage two spaced adjoining ceiling joists; an elongated linearly expanding brace means which is aligned with and connected between said first and said second walls, said brace means readily expanding in length to force said first and said second walls to contact and engage their respective ceiling joists, said brace means including a tubular member rotatably mounted to said first wall, a threaded rod member threadedly and telescopically connected to said tubular member, one end of said threaded rod member being in fixed non-rotative engagement with said second wall, said first and said second walls supporting said brace means in a direction substantially parallel to the plane of the ceiling; and a junction box connecting means to rigidly connect a junction box of a heavy load to the central section of said brace means; and improvements, which comprise:

each of said first and said second walls has a receiving groove adjacent to said spike protrusions; said hanger assembly further comprising an alarm device, a cell means, and a switching means including a contact switch disposed in each said receiving groove and actuated when said first and said second walls fully engage their respective ceiling joists, said switching means electrically connecting said alarm device to said cell means to operate said alarm device when said switching means is actuated, thereby indicating that said hanger assembly has fully engaged said ceiling joists.

2. The expansible load-bearing junction box hanger assembly as claimed in claim 1, wherein said tubular member has a threaded bore and an inward annular flange at one end, said annular flange having an inner annular edge in sliding contact with said threaded rod member, said threaded rod member having an enlarged threaded end extending into said tubular member and engaging said threaded bore.

3. The expansible load-bearing junction box hanger assembly as claimed in claim 2, wherein said hanger assembly is installed without requiring complete removal of a previously installed light-weight hanger assembly over which said hanger assembly is installed; each of said first and said second walls having a lower end with a central notch formed therein, said central notch allowing said first and said second walls to straddle remaining stub portions of the previously installed light-weight hanger assembly.

* * * * *